United States Patent Office 3,517,316
Patented June 23, 1970

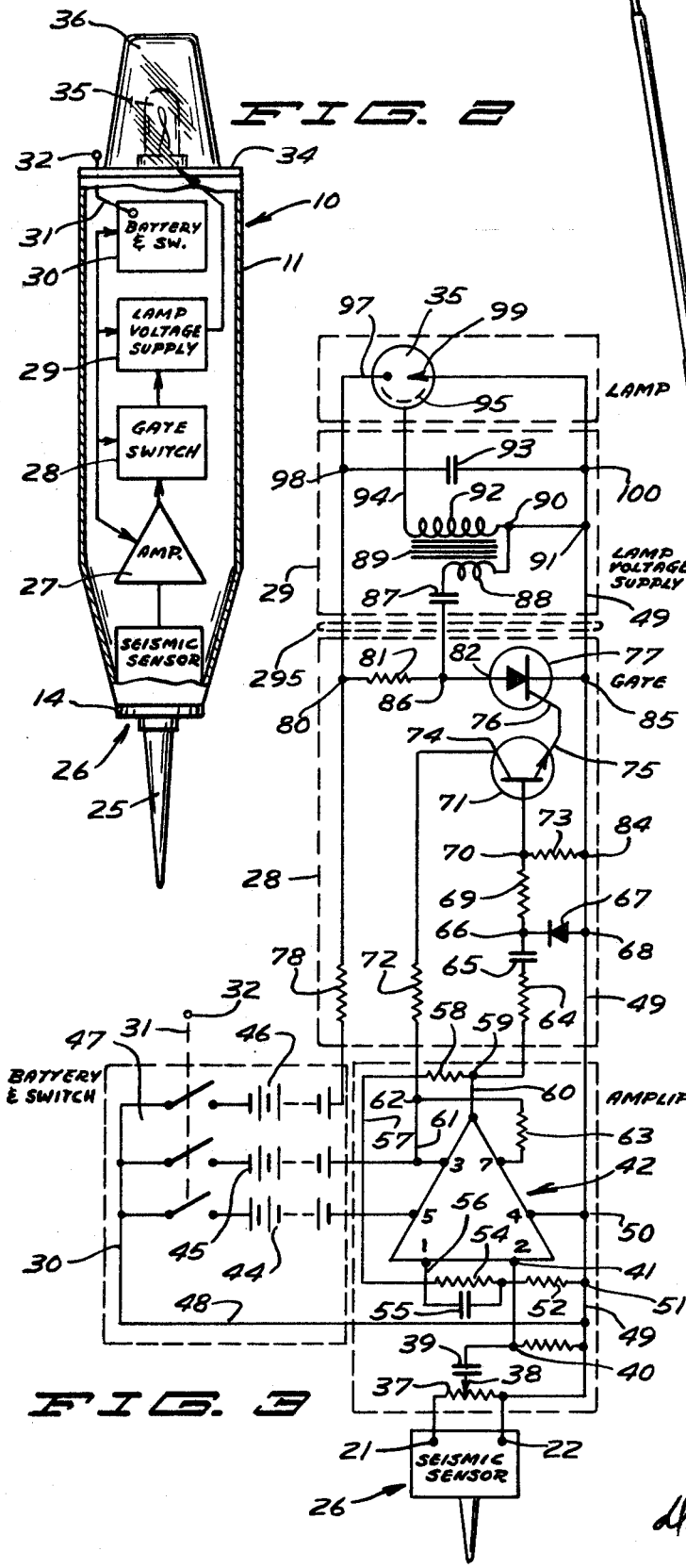

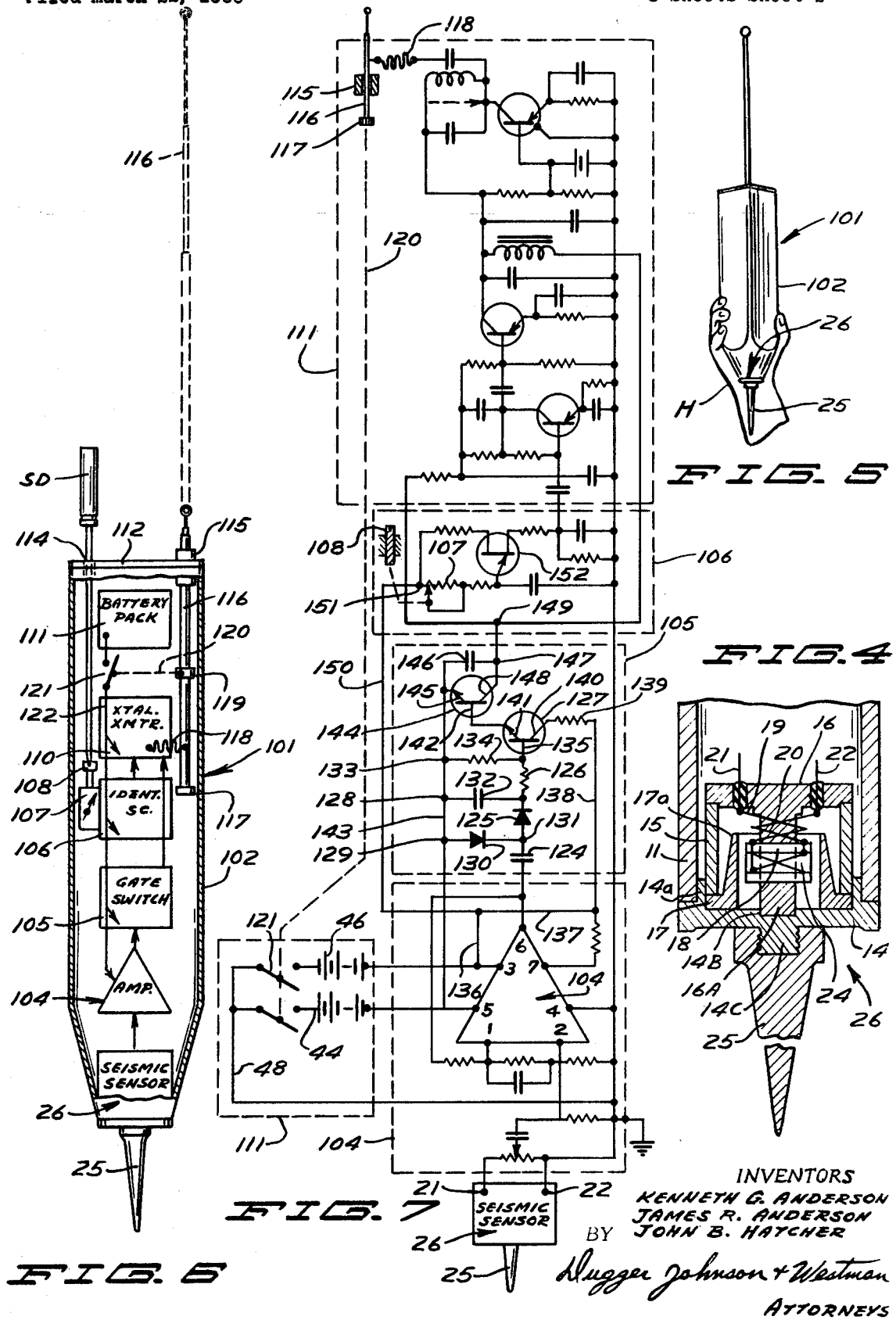

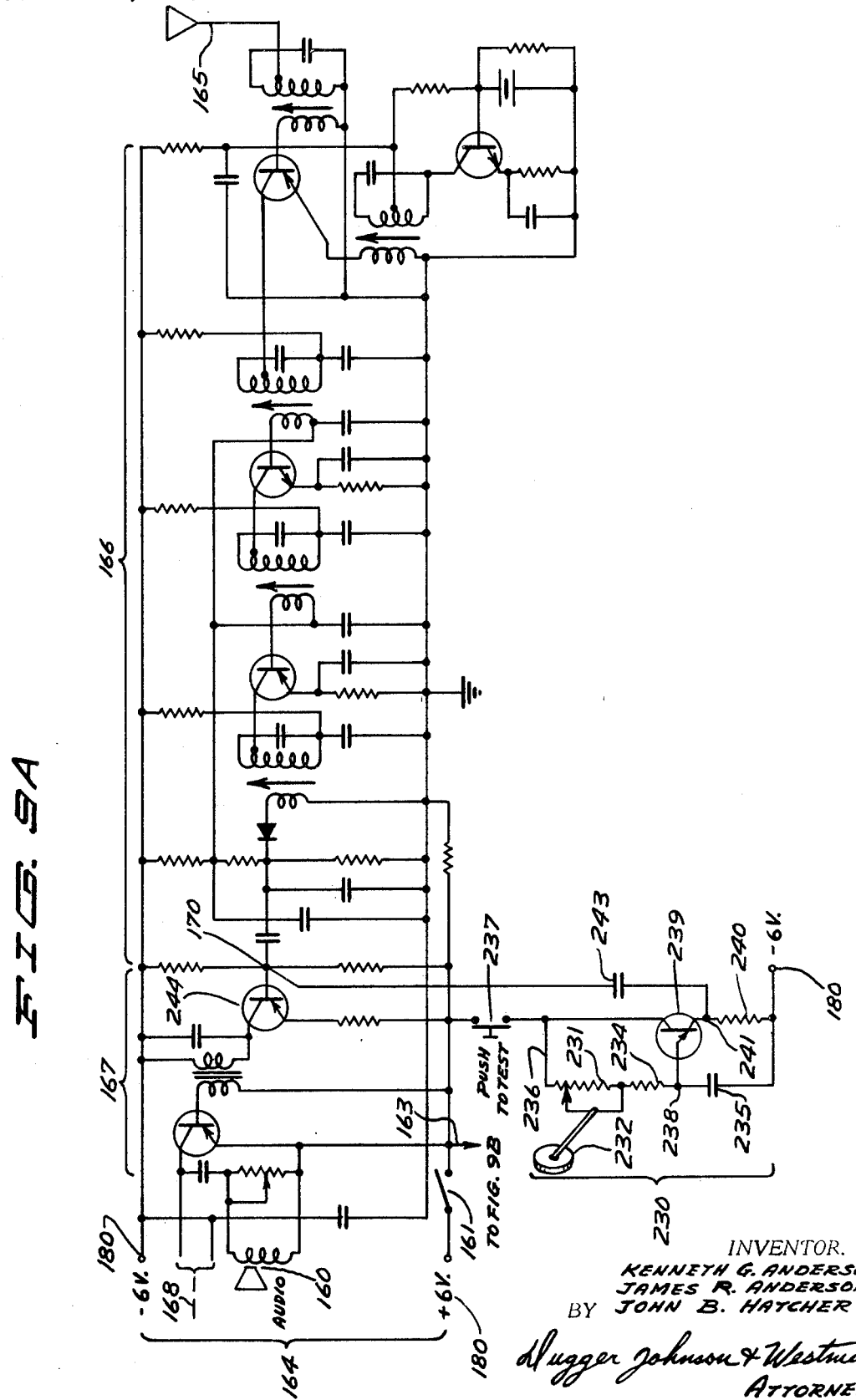

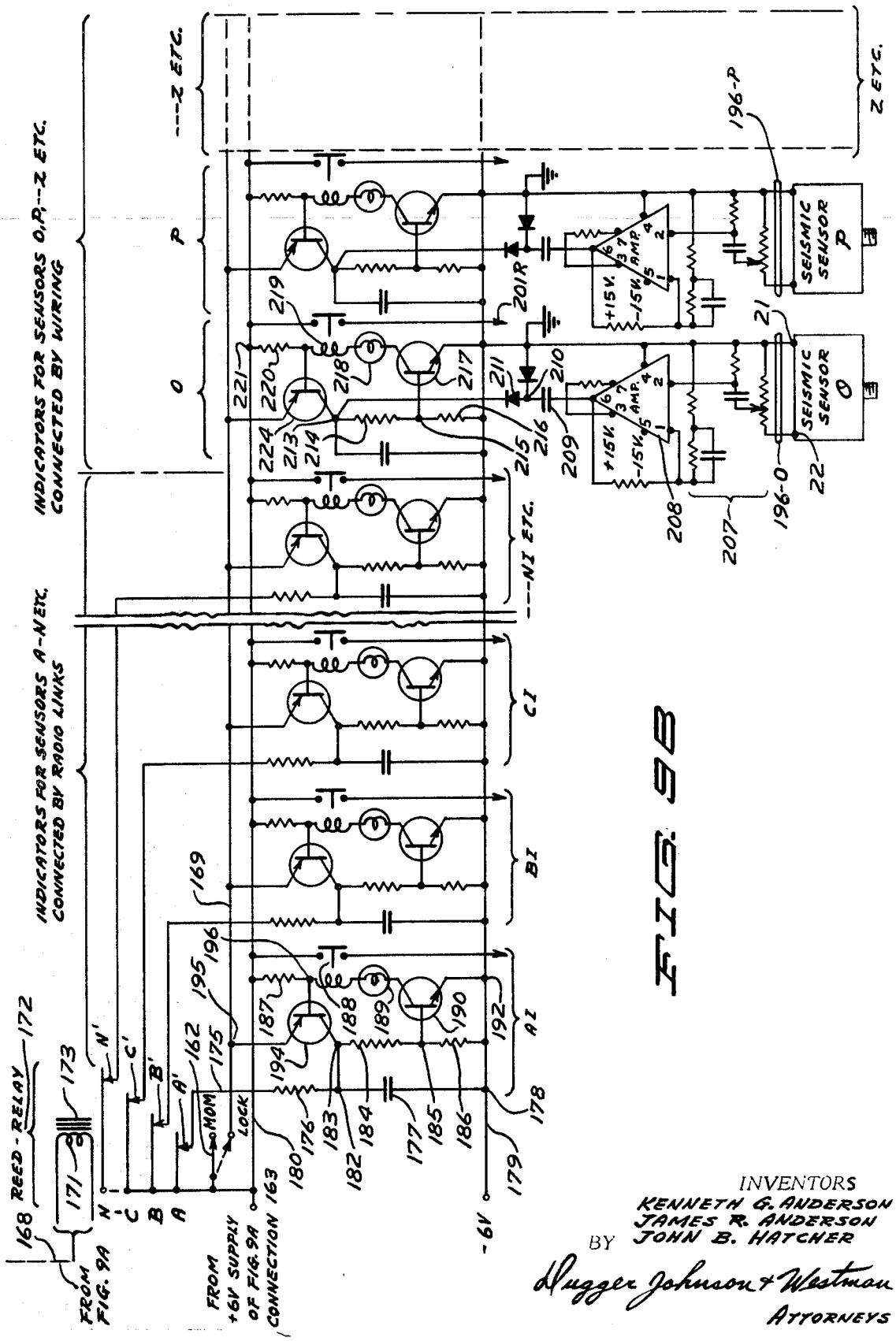

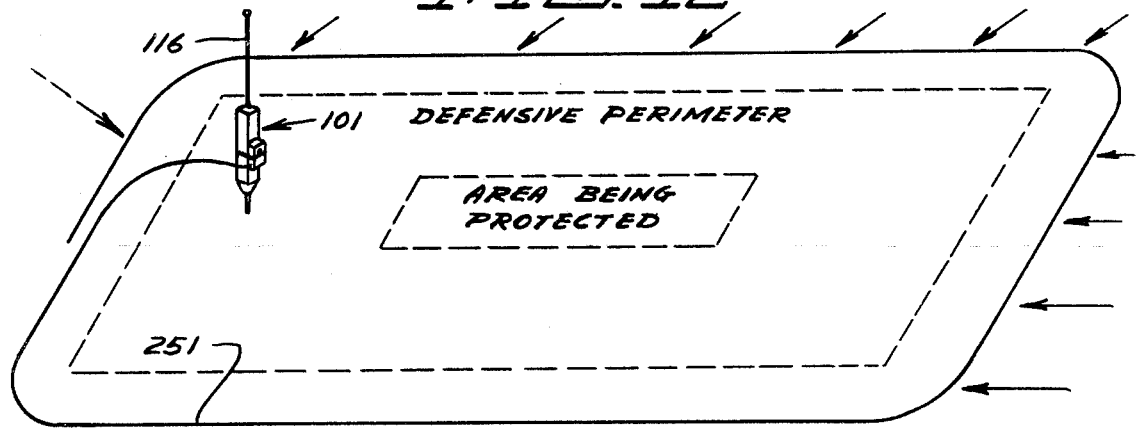
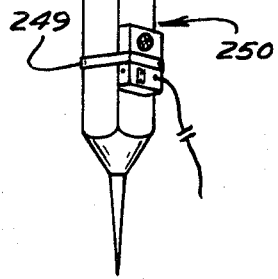
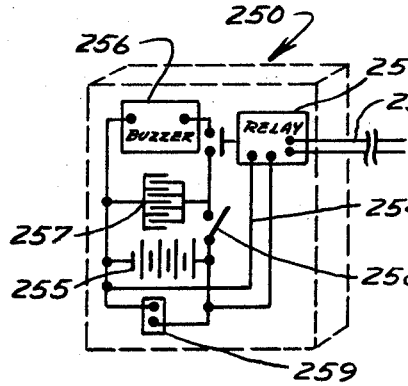
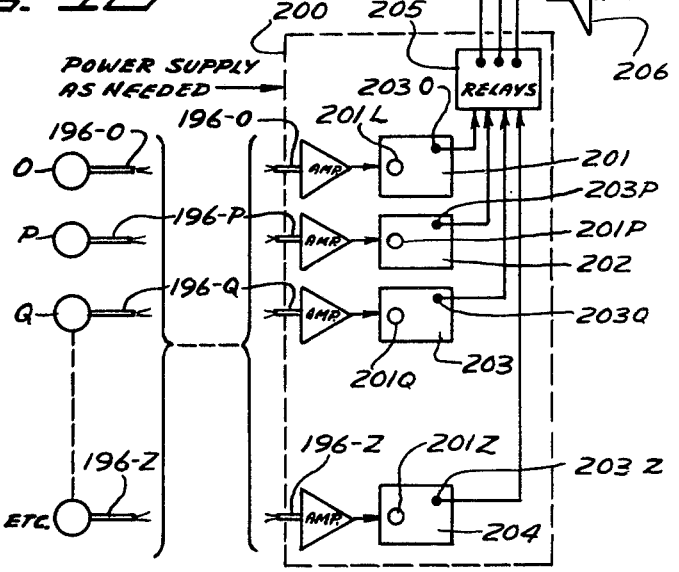

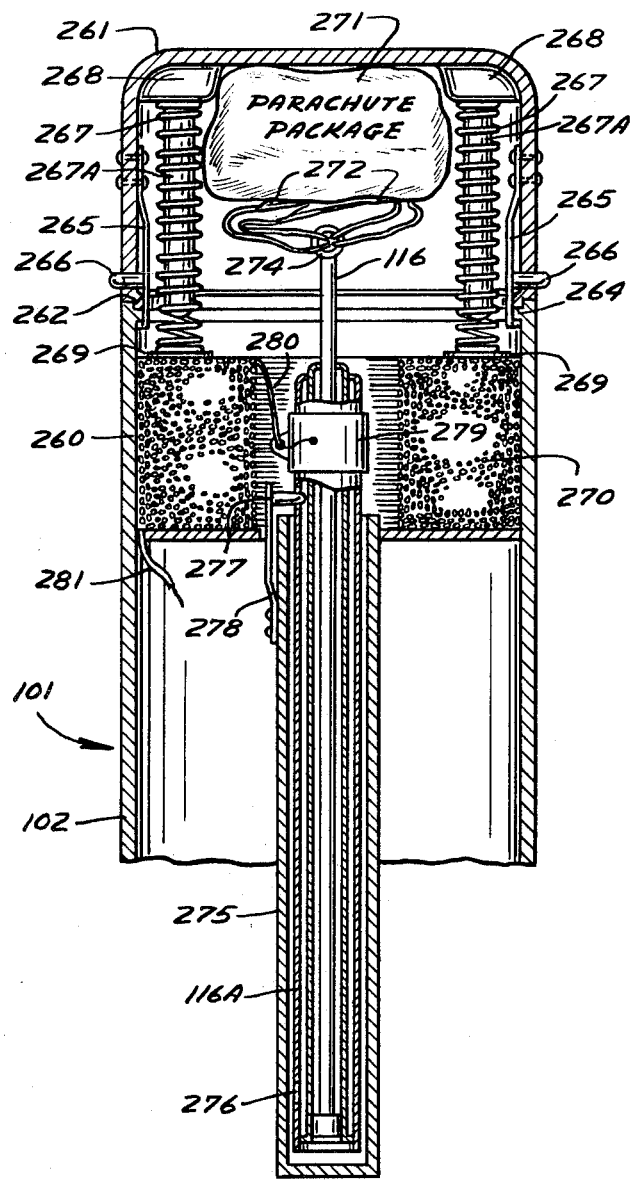
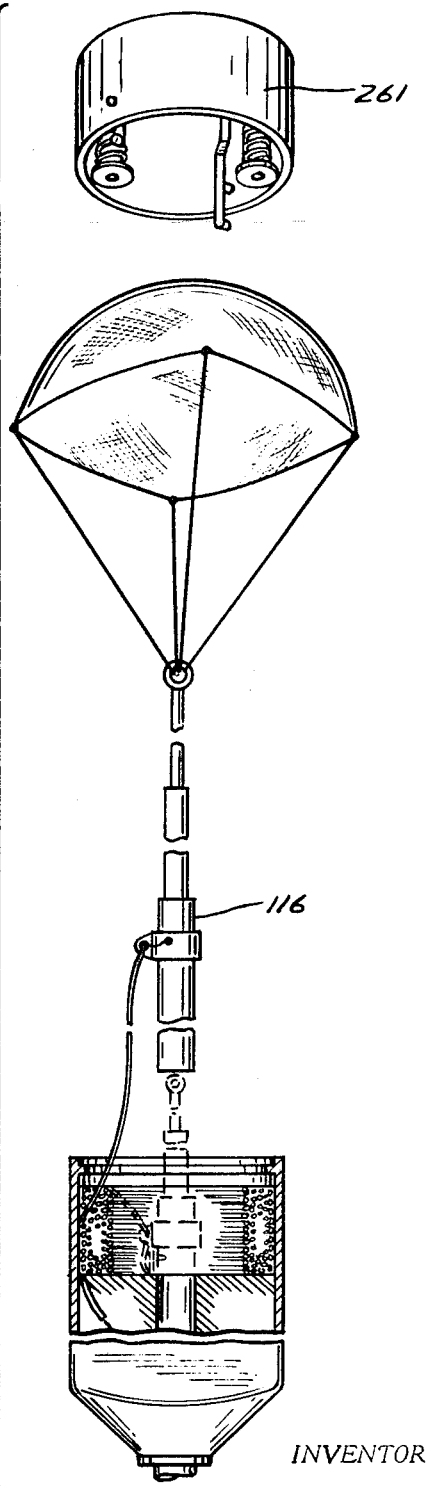

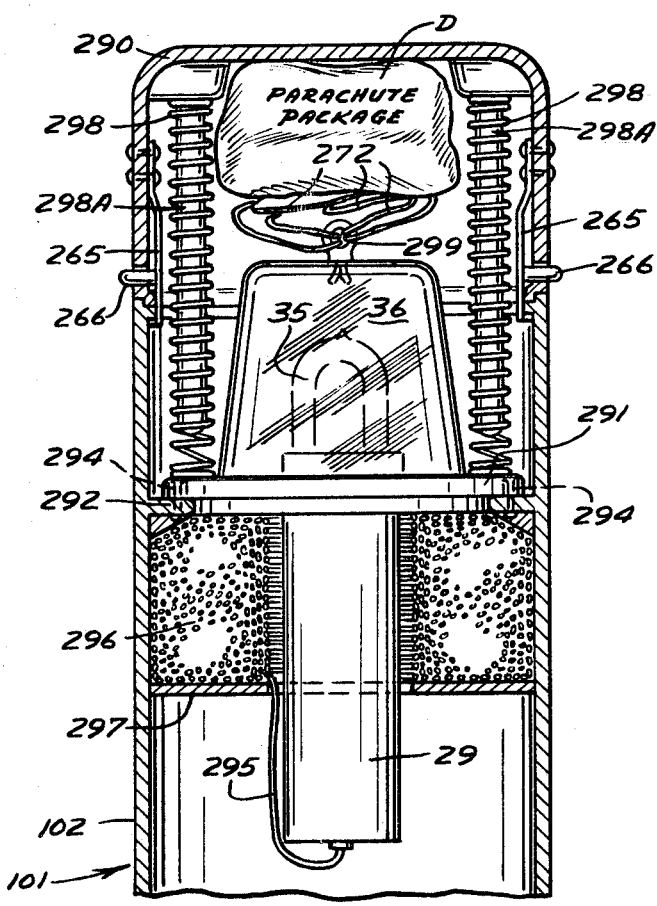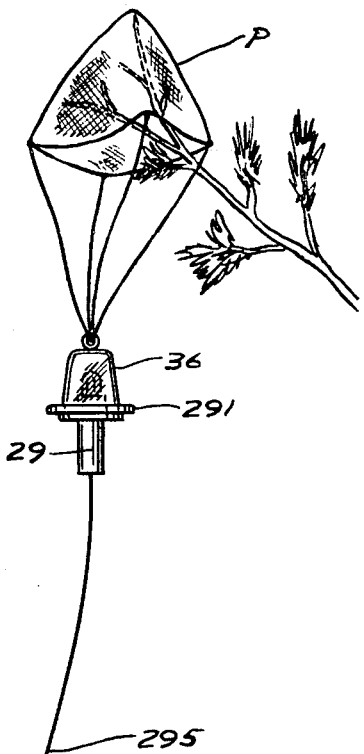

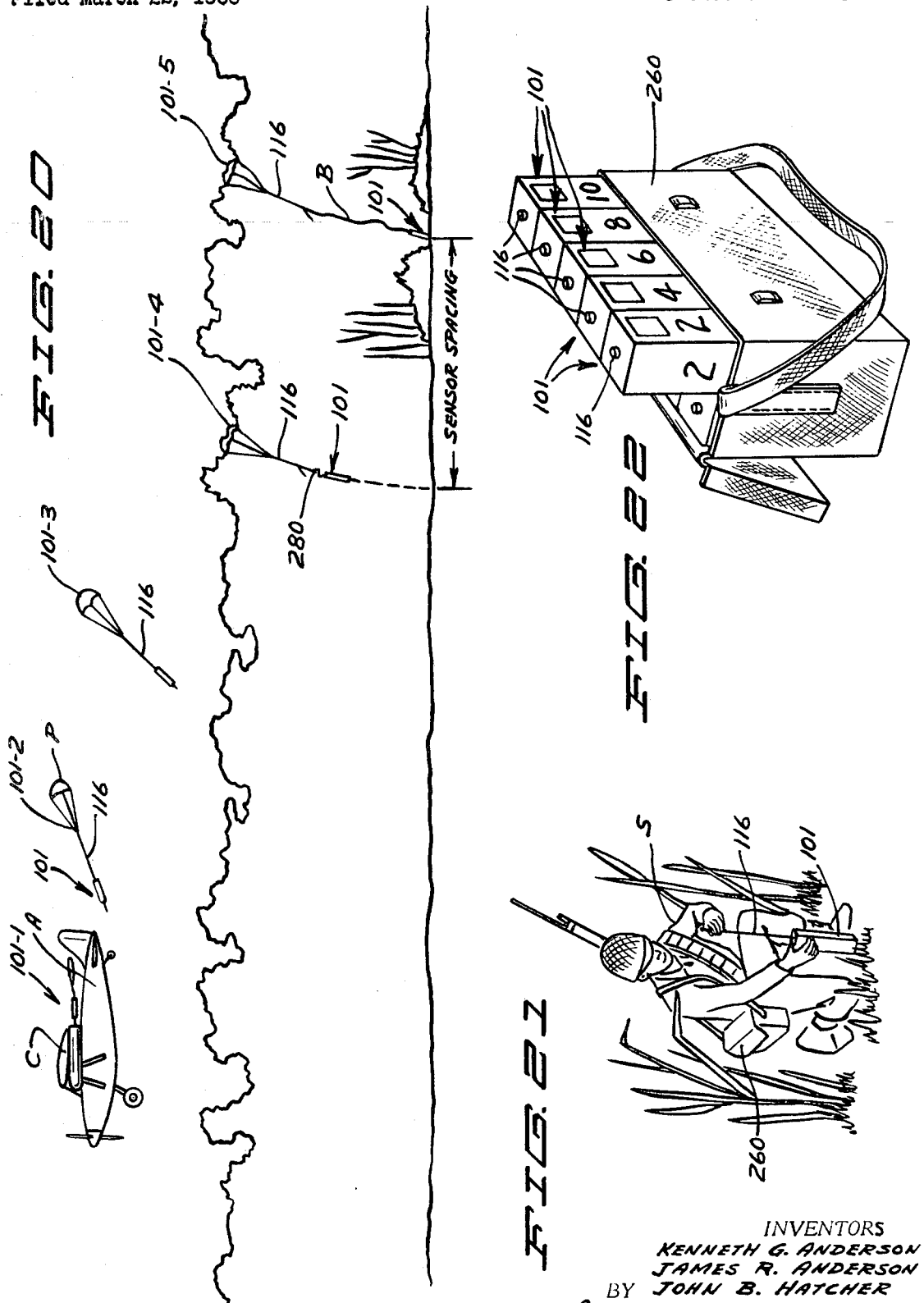

3,517,316
SURVEILLANCE EQUIPMENT AND SYSTEM
Kenneth G. Anderson, James R. Anderson, and John B. Hatcher, Minneapolis, Minn., assignors, by mesne assignments, to Research Instruments & Controls, Inc., a corporation of Minnesota
Filed Mar. 22, 1966, Ser. No. 536,324
Int. Cl. H04b 1/02
U.S. Cl. 325—113
8 Claims

ABSTRACT OF THE DISCLOSURE

A sensor in the form of a Geophone generates an electrical signal in response to the footsteps of a human being. After amplification, the signal closes a switch to supply electric power from a battery to a signaling device. All of the components for providing the sensing and signaling are located in a single housing to provide a self-contained unit. A parachute permits the unit to be dropped safely from an aircraft. Provision is made for sending coded ratio signals to a central receiver from each unit when a number of units are used, means being provided at the receiver for discriminating between the various coded signals so as to identify the particular unit or units that are transmitting a signal.

---

This invention relates to surveillance equipment and system, which may be used for the detection of the movement of human beings. In military, as well as civilian situations it is frequently desirable to detect the presence of human beings at or near a certain place. From the military standpoint the detection of enemy personnel has historically been principally by direct observation, whereas in civilian situations a variety of types of sensors have been employed. In every case, the problem is to detect the presence or movement of human beings and their associated equipment, in the event they have equipment with them.

It is an object of the present invention to provide surveillance equipment and systems for the detection of the presence of human beings. It is a further object of the invention to provide equipment and systems for the seismic detection of the movement of human beings and to provide signals and/or operation of working devices as a result thereof. It is another object of the invention to provide a seismic device capable of detecting movement of human beings and as a result thereof to provide an illuminated signal at the place of detection or a radio signal at a remote location. It is a further object of the invention to provide a seismic detector system and radio links therewith, together with identification devices so that at a central location the user may determine the presence of human beings at or near particular detectors. It is a further object of the invention to provide seismic detector sytems utilizing radio and wired connections from several or many seismic detectors diversely located at a plurality of locations, together with signaling equipment at a central location for indicating the particular seismic detectors which are operated indicating the probably presence of human beings, and to provide responsive devices for indicating the same, operating signaling devices, lighting devices, etc. It is a further object of the invention to provide in connection with a seismic detector of any of the types aforesaid, an extension device which, when operated by a trip wire, produces a buzzer signal at a particular station, for in turn operating such seismic detector and signaling equipment. It is another object of the invention to provide seismic detectors of rugged construction which may be used in combat zones, and emplaced by hand or by air drop methods, and it is a particular object of the invention to provide seismic detectors, equipped with parachutes so that they may be readily dropped and placed at particular locations, by means of air vehicles.

Other objects of the invention include the provision of seismic detectors capable of being operated by earth vibrations produced by movements of human beings and which are also light in weight, small in volume, inexpensive, capable of use in a wide variety of geographical, topological and weather conditions, so rugged as to be capable of emplacement by air dropping and highly flexible for military and civilian use.

Other and further object are those inherent in the invention herein illustrated, described and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGS. 1, 2 and 3 are related and show an examplary embodiment of the invention, FIG. 1 being a perspective view of the device as held in the hand; FIG. 2 a vertical view, partly in section, illustrating the device shown in FIG. 1, and illustrating by means of block diagrams the seismic detector and associated electronic equipment, power supply and signal lights, and FIG. 3 a wiring diagram, showing in greater detail the wiring used in the device of FIGS. 1 and 2:

FIG. 4 is an enlarged fragmentary vertical sectional view of an exemplary form of seismic sensor unit utilized in the invention;

FIGS. 5, 6 and 7 are related views illustrating another embodiment of the invention wherein the signal is transmitted by radio for reception at a remote station, FIG. 5 being a perspective view of the seismic detector unit with the radio antenna partially extended, FIG. 6 a vertical view, partly in section, ilustrating by means of block diagrams the detector, the electronic equipment power supply and radio transmitter and FIG. 7 a wiring diagram showing in greater detail the wiring of the device shown in FIGS. 5 and 6;

FIG. 8 is a perspective view of an exemplary form of radio receiver suitable for receiving signals from a plurality of radio linked seismic detector units of the type shown in FIGS. 5, 6 and 7;

FIGS. 9A–9B, and FIGS. 10 and 11 are associated views of an exemplary form of radio receiving station. FIGS. 9A–9B taken together show a wiring diagram of a receiving station wherein some of the seismic sensor detectors are connected to the receiving station by radio transmission links and others of the seismic detectors are connected by ordinary wired circuits. FIG. 10 is a vertical sectional view of an earth section, illustrating a typical installation where the seismic sensor is buried underground and connected by wires (which can also be buried) to a central receiving station. FIG. 11 is a wiring diagram showing a plurality of seismic sensors of the type shown in FIG. 10, or similar, and connected by ordinary wiring to a central station where the signals of the seismic sensors are received, amplified and utilized. A portion of the wiring system shown in FIGS. 9A–9B may be of the same type as shown in FIG. 11. The radio receiving portion of FIGS. 9A–9B is exemplary of the wiring used in the hand-held "receiver" of FIG. 8;

FIGS. 12, 13 and 14 are related views, FIG. 12 being an isometric view illustrating the seismic detectors of the radio type, having on it an auxiliary alarm device, attached by the rubber binder, and capable of seismically operating the seismic detector, said alarm device having an extended wire which is arranged around the defensive perimeter of an area being protected. FIG. 13 shows the seismic detector of FIG. 12 and associated auxiliary alarm device, and FIG. 14 shows the wiring of the auxiliary alarm device shown in FIGS. 12 and 13;

FIGS. 15, 16 and 17 are related views illustrating a modified form of the invention utilizing a parachute equipment for air drop emplacement of the seismic detector, which is of the radio transmitter type of FIGS. 5–7. FIG. 15 is a side elevational view of the seismic detector shown, the portion within the dotted circle of FIG. 15 being shown in vertical sectional view in FIG. 16. FIG. 17 is a separated view illustrating the manner in which the container (of FIGS. 15 and 16) opens, the parachute is ejected and spreads, the antenna withdrawn, and the seismic detector is lowered during the air dropping operation;

FIGS. 18 and 19 are similar to FIGS. 16 and 17, and illustrate an embodiment of the invention wherein a parachute package is provided for the light-signal type of seismic detector unit of FIGS. 1–3, FIG. 18 being a vertical sectional view (similar to FIG. 16) of the upper portion of the seismic detector including signal lamp and parachute pack, and FIG. 19 is an illustration of a landing position of the seismic detector with the lamp elevated and suspended by the parachute when snagged on branches of a tree;

FIG. 20 is a vertical side elevational view illustrating the process of air-dropping parachute equipped seismic detectors of the radio-transmitter type (shown in FIGS. 5–7 and 15–17);

FIGS. 21 and 22 are pictures illustrating the manner in which military personnel places the seismic detectors by hand. FIG. 22 is a perspective view showing a carrying case having a set of radio-transmitter type seismic detectors suitable for use in military or civilian operations.

Throughout the drawings corresponding numerals refer to the same parts.

In this specification the seismic waves produced in earth by human beings such as those due to footsteps or other body movements of human beings; the seismic waves produced by human use of tools such as, for example, a pick or shovel; and seismic waves produced by devices for which humans are responsible, such as vehicle noises, engine noises, etc. are all, for convenience, hereinafter collectively designated "human-seismic waves." Of these the waves produced by footsteps are generally smaller seismic waves than those produced by vehicles and engines. Also, for convenience in nomenclature, the term "seismic sensor" (as used herein) is intended to mean the device which per se, generates a usable signal in response to such human-seismic waves and the term "seismic detector" is the assembly, as in FIGS. 1–3, FIGS. 5–7, FIGS. 15–17 or FIGS. 18–19, including the "seismic sensor" and associated equipment for producing a useful and utilizable signal.

According to the present invention it has been discovered that seismic sensors of known type which are normally used for geophysical and similar purposes, may be utilized for detecting the minute shock waves produced in the earth's surface by the "human-seismic waves," even the minute seismic waves in this category covered by footsteps and other body movements of a human. We have discovered that for detecting such human-seismic waves, there may be used presently available seismic sensors preferably of the electrodynamic type, illustrations of which are shown in Shock and Vibration Hand Book, Basic Theory & Measurements, vol. 1, McGraw-Hill Book Company, 1961, at pages 15–4 et seq. While the physical construction of different makes of such electrodynamic seismic sensors vary from one manufacturer to another, they all in one way or another utilize a permanent magnet field, within which a coil provided with some mass, is suspended resiliently for movement. Seismic sensors, other than the electrodynamic type, such as crystal-pickup sensors, can be used but we prefer the electrodynamic type because of sensitivity, low cost, and proven ruggedness in field use.

The seismic sensor is normally contained in a casing or shell, and in normal use for geophysical explorations and such like industrial uses, the device is placed in or on the earth, and when earth tremors occur due either to natural causes or due to explosions, etc. purposely detonated, the casing normally carrying the magnetic field will move relative to the coil which, due to its mass, will tend to remain immovable, and a small electromotive force is thereby generated in the coil, as the output signal from the sensor.

One form of such electrodynamic seismic sensor which we have found to be suitable for purposes of the present invention, is called a Miniature Seismic Detector, Type EVS2, Catalogue No. 100241–38, manufactured by The Electro-Technical Labs Division of Mandrel Industries, Inc., Houston, Tex. From our experiments we have discovered that such device, and equivalent seismic sensors, are sufficiently sensitive so as to provide a usable signal when subjected to human-seismic waves within an effective radius of say 30 to 100 feet and sometimes more. Human-seismic waves are transmitted through the earth until attenuated by distance of travel. The rate of attenuation will vary depending upon the strength of the original disturbance, the type of earth formation through which the wave travels and other factors. A seismic sensor of the type aforesaid is sufficiently agitated by such slight human-seismic waves, so as to produce a useful signal indicative of the presence of human beings in the vicinity, say within 30 to 100 feet, of the sensor. There are situations where human-seismic waves caused by footsteps or body movement may be masked out by other seismic disturbances produced by other causes, such as those caused by the movement of heavy vehicles in the vicinity of the sensor, the movement of tree roots due to tree movements caused by wind, vibrations and movements of machinery, doors, etc. in buildings, and other factors, and while these masking effects must be considered, such does not seriously detract from the utilization of the aforesaid seismic detector for the purpose of detecting the movement of human beings in certain places, as in swamps, jungles, fields and such like places, as often is the case in military and some civilian situations. Thus, should a heavy vehicle such as a truck, move along a highway, within range of one or several such seismic sensors, its movements will soon pass, i.e. it will occur only for a short time, and then signals subsequently received from the seismic detectors in the vicinity of the highway may be re-evaluated for indication of movement of human beings in the nearby terrain. Similarly if a high wind should cause movement of trees in a jungle, wherein a plurality of such seismic detectors are placed at varying intervals, the simultaneous signals (due to earth waves produced by tree movements) while masking out the signals produced by movements of human benigs, can be recognized as storm-produced. Therefore, from the standpoint of utilizable results, we have discovered that, except for certain usually explainable periods when all or some sensors may become non-discriminatory, as during a storm, or where certain detectors may become non-discriminatory due to the movement of explainable heavy equipment, or due to other explainable phenomena, the utilization of such seismic sensors does produce good and valuable results. The present invention is based upon such discovery.

Referring to FIGS. 1–4, in these figures there is illustrated an embodiment of the invention wherein, for each seismic disturbance, the seismic detector produces, at the location of the detector, a light signal of high intensity and short duration. In FIG. 1 the sensor generally designated 10 has a rugged housnig 11 here illustrated as of square cross section, merging downwardly as a generally conical base at 12. At such base there is a circular plate 14, which is a portion of the seismic sensor, per se. Referring to FIG. 4, which illustrates the seismic sensor, the base 14 is an endplate, and has a flange 14A which receives a cylindrical length of permanent magnet materials 15, on the upper end of which there is an end plate 16, having a downwardly extending portion 16A, which acts as a pole-piece. The base 14 is not of magnetic material and it is recessed at 14B to receive the lower end of the pole-piece 16A, and the two part pieces 16A and 14B are thereby fastened together, usually sealed. At the lower end of the cylindrical magnet 15 there is an inner pole-peice 17 which seats within the flange 14A of the bottom plate 14, and extends upwardly as a hollow frusto-conical shape terminating at 17A, within the hollow annular space within the cylindrical magnet 15 and outside the pole-piece 16A. There is accordingly a very strong magnetic flux radially across or through such annular space between the inner surface of pole-piece 17A and the outer surface of pole-piece 16A. Within this annular space there is a movable spool 18 of para-magnetic material supported by two spiral springs 19 and 20 from terminal posts 21 and 22, these being sealed in insulation and extended through end plate 16. On the magnetic mass 18, which is in the form of a spool which is freely movable around pole-piece 16A, there are wound many turns of wire in the coil 24. The electrical leads to the coil are by means of the spiral springs 19 and 20. The spool-shape magnetic mass 18 with the coil on it, is freely suspended for vertical movement in the annular space between the pole pieces, and in some sensors can also move sideways within limits. Whenever the sensor is agitated due to waves in the earth, the sensor body as a whole moves, but the magnetic spool 18 wtih the coil on it tends to remain stationary due to its inertia, and consequently a slight voltage signal will be generated in the coil 24 which is made available at the terminals 21 and 22. The bottom plate 14 is provided with a threaded connection 14C and on tihs there is screwed a downwardly extending spike 25. For convenience, the entire seismic detector, as shown in FIGS. 5 and 6, including the spike 25 on it may be set up by pushing the spike into the earth. We have discovered that this provides a usable signal in response to earth waves produced by the footsteps and body movements of human beings, herein called human-seismic waves.

Within the casing 11, as shown in FIG. 2, there is provided an amplifier 27, a switching mechanism or "gate" 28, a lamp voltage supply source 29 and battery and switch pack 30. The switch of pack 30 will normally be external to the pack and normally open and is arranged with a manual actuator 31 so that it can be closed by the exterior pull 32, for putting the whole device in operation. A top cover 34 on the casing serves to support a gaseous conduction flash lamp 35 which for protection is cast into a clear plastic molding 36 attached solidly to the cover 34. Referring to FIG. 3, the output terminals 21 and 22 of the seismic sensor are connected to a resistor 37 having a variable tap 38 connected through condenser 39 and junction 40 to signal input terminal 41 of a standard and known amplifier generally designated 42. Many forms of amplifiers are available and suitable for use in this invention and the specific wiring between the sensor 26 and amplifier, and thence to other components of the seismic detector may vary according to the amplifier used. The one illustrated in FIG. 3 (also in FIG. 7) is known as an "all silicon, solid-state operational amplifier," Type SQ2, manufactured by Nexus Research Laboratory, Inc., 480 Neponset St., Canton, Mass. Other equivalent amplifiers may, of course, be substituted.

The battery and switch pack 30 in this instance contains two 15 volt batteries 44 and 45 connected so as to provide negative supply voltage to terminal 5 and positive supply voltage to terminal 3 of the amplifier. The battery pack also provides a higher voltage battery 46 which serves as a power source for the lamp voltage supply 29. For the battery and switch pack 30 there is a normally open, three pole, single throw switch 47 operated by the pull 31–32. When the device is to be activated the switch is pulled to "closed" position and voltage supply is then available from all batteries to the system. When the switch 47 is closed, the positive terminal of battery 44 is connected at 48 to line 49 which extends through the system. Terminal 4 of the amplifier is connected to line 49 at junction 50. From junction 51 a circuit extends through resistor 52 and resistor 54 and capacitor 55 in parallel to junction 56 which is connected to terminal 1 of the amplifier and thence also from junction 56 via line 57 and resistor 58 to junction 59, which is on the output line 60 of the amplifier. From terminal 3 which is the positive battery input from battery 45 to the amplifier, line 61 extends to junction 62 and thence via resistor 63 to terminal 7 of the amplifier. From junction 59 a circuit extends via resistor 64, capacitor 65 and junction 66 which is connected through the diode 67 to the junction 68 on the line 49. From junction 66 the circuit extends through resistors 69 to junction 70, and thence to the input of transistor 71. Junction 70 is connected through resistor 73 to junction 84 on line 49. A line extends from junction 62 via resistor 72 to terminal 74 of the transistor 71. The output terminal 75 of transistor 71 is connected to input 76 of the silicon controlled rectifier 77, which acts as a switch, when conductive. From the positive terminal of battery 46 a circuit extends via resistor 78 to junction 80 and thence through resistor 81 to terminal 82 of the silicon controlled rectifier 77 and thence to junction 85 on line 49. When the transistor 71 is energized a signal is supplied to the rectifier 77 and a current pulse traverses the resistor 81, thereby lowering the voltage at junction 86. The voltage from junction 86 is applied through condenser 87 and coil 88 of transformer 89 and thence via junction 90 to junction 91 on the lines 49. A circuit extends from junction 91 through the secondary 92 of the transformer and via line 94 to plate 95 of the gaseous conduction lamp 35. Terminal 97 of the lamp is connected through junction 98 to line 79 and terminal 99 is connected to line 49.

In operation when a human-seismic wave actuates sensor 26, a signal is provided across resistor 37, this is applied to the input of amplifier 42 and is amplified and the output signal is then impressed through transistor 71 and upon silicon controlled rectifier 77 of the gate switch mechanism 28 which then conducts. This permits a current pulse to pass through the primary 88 of transformer 89 of the lamp voltage supply 29, thereby providing the appropriate voltages between plate 95 and terminal 99 of the gaseous conduction lamp so as to initiate conduction. Conduction then ensues between terminals 97 and 99 and continues until condenser 93, which is normally charged, has been discharged and this produces a sharp bright flash. The flash sharply terminates as condenser 93 discharges. It will be noticed that condenser 93 is connected from junction 98 of the positive supply line 79 to junction 100 on the negative line 49. This condenser is charged whenever the battery switch 47 is closed, and once the ignition of lamp 96 is initiated by the voltage pulse on control electrode 95, the condenser 93 then discharges across the terminals 97 and 99 until the charge on the condenser is exhausted. Resistor 78 is of such a value that the discharge current through the lamp 96 cannot be maintained merely by current flow from battery 46 through the resistor 78, and therefore the lamp discharge sharply terminates. After discharge of the condenser 93, the condenser again recharges, and awaits the arrival of the next signal. An observer at a position quite remote from the seismic detector unit 10 is thus alerted to the circumstance that some seismic disturbance has triggered the operation of the device. Such illuminating flash signals from the lamp 35, under normal weather conditions, can be observed at great distances, and from an elevated position, as for example on a hill, a tall tree, or from an aerial vehicle such as an airplane or helicopter, a very considerable area may be visually surveyed, with consequent good results from the surveillance standpoint. It is to be understood, of course, that a plurality of such seismic surveillance devices 10 will normally be positioned around the area to be protected, preferably at spacings of 50 to 100 feet, and thus surprise intrusion into the area is minimized.

Referring to FIGS. 5–8, 9A and 9B, there is illustrated a further exemplification of the invention wherein the signal provided as a result of seismic disturbance is transmitted by radio signal to a central receiver station which is remotely located. Each seismic detector is provided with an identification code signal suitably applied to the transmitted radio signal which indicates seismic disturbances and for the invention there is provided a remotely located receiving station which is adapted to receive the signals from the several seismic detectors transmitting stations and discriminate between such received signals so as to indicate which of the seismic detectors is signaling a human seismic disturbance. Many types of transmitter-receiver systems are commercially available having suitable discriminatory coding arrangements. Merely as an illustration herein, the individual seismic detectors are of a type that send out amplitude modulated high frequency radio signals of a different frequency of modulation for each detector in a set, and at the receiving station there is provided a "reed-relay" receiver which discriminates between the signals being received so as to provide an indication identifying the detector or detectors which are transmitting. However, it will be understood that equivalent solid state circuitry for handling amplitude or frequency modulated encoding and decoding of the identifying signals or employing solid-state digital encoding and decoding may be employed within the purview of the invention. The particular radio linkage chosen and the type of identifying signal utilized will depend upon the particular service environment, cost, etc.

In the illustration of the invention in FIGS. 5, 6 and 7, the seismic detector transmits a high frequency radio signal whenever it is seismically disturbed, and as an identification the radio signal of each such seismic detector is amplitude modulated at a certain lower frequency for the purpose of identifying the particular seismic detector which is transmitting. In these figures, the seismic sensor 26 is the same as previously described and is mounted at the lower end of a rectangular housing 102 which is tapered at the bottom as previously described, and on the seismic sensor there is attached a sharp point 25 to facilitate the emplacement in the earth. Within the casing there is provided an amplifier 104 which can be identical with the amplifier 42 in FIG. 3.

Withon the casing there is also provided a gate switch 105 equivalent to that shown at 28 in FIG. 3, an oscillator 106 which is for the purpose of producing a modulation signal for identifying the particular unit 101. The oscillator has an adjustment at 107 which can be changed by rotating screw 108. Also within the casing there is a crystal control transmitter 110, and a battery pack 111. On the top cover 112 of the casing there is provided a bushing 115, supporting the retractable antenna 116. In the retracted position as shown in full lines in FIG. 6, the antenna is almost wholly contained within the housing. It will be noted that the antenna has a small eye at its upper end, which is for the attachment of a parachute, as will later be explained, however, it is intended that the entire unit 101 can also be put in place manually by carrying it to the site, whereupon the antenna is pulled out to the dotted line position of FIG. 6, after which the operator will proceed to another site for placing another unit 101, etc. The antenna is connected to transmitter 110 by flexible connection 118 and has a bottom cap or other collar 117, which is adapted when the antenna is pulled out to its dotted line position, to engage some mechanical contrivance such as a collar 119 within the case, and move it, and by means of the movement of such contrivance 119, and the linkage 120, by the outward extension of the antenna, will cause the swicth 110 to be closed, thereby supplying power from the battery pack 111 to the power line 122 which connects to the crystal transmitter, the identification oscillator, the gate switch and the amplifier. Thus the user need only pull out the antenna and the device is thereupon energized so as to be in operation, and will continue to operate so long as the battery supply lasts which can be for an extended period.

In the top cover 112 there is provided a small hole through which a screwdriver SD may be inserted to reach screw 108, which when turned adjusts potentiometer 107, see also FIG. 7, and in so doing the modulation frequency by which unit 101 is identified can be changed through a full range from high to low within the capability of the oscillator 106. It may be stated parenthetically that the transmitter 111 and the oscillator 106, are well-known standard devices of a type mostly used for the remote control of miniature devices, such as model trains, automobiles, airplanes and such. The oscillator 106 will normally have a sufficient range of adjustment by means of the potentiometer 107, together with its adjustment screw 108, or other control, so that the oscillator section 106 can be adjusted through for example ten or twelve different oscillating frequencies which will match the frequencies of vibration of ten or twelve reeds of a "reed-relay," at a cooperating receiving station. Accordingly, in the present invention there is utilized for the oscillator 106 and the transmitter 107 what is substantially standard equipment readily available. We have discovered that such equipment can be made sufficiently rugged to that it will withstand even military uses, including hard drops by means of parachutes, etc., without undue disablement of the equipment.

The battery and switch pack 111 of the device shown in FIGS. 5–7 contains only two batteries rather than three as shown in FIGS. 3, since the voltage requirements of the radio transmitter 110, oscillator 106, gate 105 and amplifier 104 are modest and not so high as the voltage requirements via battery 46, for the lamp voltage supply 29 and lamp 35. Therefore, in FIG. 7, the battery pack includes only the battery 44, which supplies negative 15 volts to terminal 5 of the amplifier and to the associated equipment, and the battery 46 which supplies positive 15 volts to terminal 3 of the amplifier and positive voltage for the associated equipment. These batteries are normally out of circuit, but their circuits via the line 48 are closed by the switch 121 which is normally open but is adapted to be closed when the antenna 116 is extended. Wtihout further detail it may, therefore be stated that when a human-seismic wave is impressed upon seismic sensor 26, a signal will be applied to the input terminal 2 of the amplifier, whereupon after amplification the signal output is applied from terminal 6 of the amplifier through condensor 124, diode 125 and resistor 126 to the transistor 127. The circuit also extends from terminal 5 of the amplifier via line 143 to junction 129, which is connected by diode 130 to junction 131, and to junction 128 which is connected by condensor 132 to the junction of diode 125 and resistor 126, and the circuit also extends from junction 133 through resistor 134 to the input terminal 135 of transistor 127. A circuit also extends from terminals 3 of the amplifier via lines 136, 137 and 138 and resistor 139 to terminal 140 of transistor 127. The output 141 of transistor 127 connects to the input 142 of transistor 144, from which at output 145, a circuit extends via condensor 146 to junction 147 on output 148, leading to junction 149 of the identification oscillator. It will be appreciated that when switch 121 (see FIGS. 6 and 7) is closed, the circuit extends from battery 46 and line 136 and thence via line 150, junction 151 and through the transistor 152 of the identification oscillator and forms the input of the crystal control transmitter 111, which is wired as shown in FIG. 7. Since the identification oscillator and crystal control transmitter are known devices their wiring and operation will not be described in detail.

For purposes of this invention any system of radio transmission having an identification signal imposed on the emitted signal will be usable. The identifictaion signal can be by frequency modulation or amplitude modulation (here illustrated) or pulse width modulation (digital) coding may be used. Digital coding is very rugged and, in general, provides a greater number of identifications than other systems.

In this particular instance the oscillator 106 produces an amplitude modulation in or slightly above the audible range, and this is read out at the receiving station which will be described. Equivalentally any other form of identification, either by frequency modulation, or pulse coding, may be utilized within the purview of the present invention. The signal resulting from the device illustrated in FIGS. 5–7 is a high frequency radio signal amplitude modulated at a frequency in the audible range and this emanates from antennas 106.

Referring to FIGS. 8 and 9A–9B, in FIG. 8 there is illustrated a type of receiving station suitable for use with seismic sensor transmitters of the type shown in FIGS. 5, 6 and 7, and suitable for both military and civilian applications. In the system of FIGS. 5–8, 9A and 9B the identification signal is amplitude modulated at particular frequencies. The receiver generally designated 155 in FIG. 8 has a case 156 of such a size here illustrated, such that it may be held in the hand H of the user. The receiver has a retractable antenna 157 which may be pushed down into the case 156 or extended, as shown in FIG. 8. At the upper portion of the case there are a plurality of apertures 158, of which ten such are illustrated in FIG. 8. Behind each aperture is an indicating light. On the front of the case there is an audio sound unit (speaker) 160, and at the bottom of the case there is an "on-off" switch 161 and another switch 162 having two positions labeled "Lock" and "Mom" (momentary). In the "Lock" position of switch 162, when any one of the lights is flashed at the apertures 158 in response to a received signal, the signal once received, will continue the illumination of the light. In short, the light signal indication is "locked" in the "signal received" condition. When the switch 162 is in the "Mom" (momentary) position when a signal is received a light will appear at one of the apertures 158 (indicative of a particular seismic detector) and the light will be illuminated only during the time that the signal is received and the will thereafter be extinguished. When in the "Lock" mode of operation, the attendant at the receiving station can turn away and take care of other duties, and give attention only occasionally to the receiver. If a sound is heard at 160 and a light comes on at an aperture 158, the light will stay on. The matter can then be investigated. All lights can be "cleared" by moving switch 162 to "Mom," in which mode of operation the attendant must keep constant watch on the receiver.

FIGS. 9A–9B taken together are a wiring diagram, a portion of which is utilized for the portable (or military) version of the equipment shown in FIG. 8. The portion of FIG. 1B under the brackets "O," "P," ". . . Z, etc." are utilized when some of the seismic sensors are connected to the receiving station by fixed wiring. In FIG. 9A the portion of the wiring diagram shown to the right of bracket 164 (and under brackets 166–167) is a standard radio receiver which is known as a "Reed-Receiver." Such type of receivers are mostly used for the remote controlling of miniature mobile equipment such as model trains, automobiles and airplanes and the like. Available "Reed-Receivers" customarily have ten or more "channels," which are selected by means of what is known as a "reed-relay" which is a frequency responsive relay having as many different vibratory reeds as there are channels, each reed being tuned for a slightly different frequency. Usually as here illustrated, the reeds vibrate in response to signals in the audible or near audible range. The radio receiver portion of the device illustrated at 164 is a standard superheterodyne solid-state receiver having an antenna 165, the usual mixing stages at 166 and audio stages at 167 leading to an output at bracket 168, including the usual audio output at 160. This standard receiver is slightly modified by providing an input connection at 170 to the input of the first audio stage of amplification. This is provided in this invention for the purpose of testing the functioning of the read out signals as will be described. In the diagram, FIGS. 9A–9B, the output at 168 leads to the coil 171 of the read-relay generally shown opposite the bracket 172. This reed-relay 172 may be contained right in the radio receiver chassis as a built-in component. It is shown separately here, only for purposes of explanation. This reed-relay 172 will have a plurality of vibratory reeds designated A, B, C, . . . N, usually ten or twelve. Each reed is so positioned as to be influenced by the magnetic field produced by the coil 171 and magnetic core 173, and the reeds A, B, C, . . . N, being of paramagnetic material, are set into vibration due to the magnetic field imposed upon them. The particular reed which is vibrated depends upon the frequency of oscillation of the magnetic field produced by the coil 171 and core 173 and this frequency will be one frequency within the audible or near audible range of modulation frequencies provided by the identification oscillator 106, see FIGS. 6 and 7. Thus by having, for example, ten seismic detectors (FIGS. 5–7) and for purposes of identification, by having each of these ten adjusted to a different modulation frequency, which is achieved by turning the adjusting screw 108 of the potentiometer 107 on the identification oscillator 106, then when a particular seismic detector 101 is disturbed by human-seismic waves, and the signal is sent, its signal is thereby modulated at a particular frequency, and hence only one of the reeds A, B, C, . . . N, corresponding to such modulation frequency will be set into vibration. In a complete system of the type illustrated for FIG. 8, for example, which has ten light signals at 158, there would also be provided ten of the seismic detectors 101, as shown in FIGS. 5–7, and each of these ten would be preadjusted to a particular frequency of modulation, so as to match the frequency of response of a particular reed, A, B, C, . . . N of relay 172. Then if a particular sensor 101 at some remote location is disturbed by by seismic waves, sufficiently to cause its transmitter to transmit, the signal which is transmitted contains the modulation identification, which thereby causes a particular reed, A, B, C, - - - N, to be vibrated, and this in turn, as will be shown, will illuminate one of the lamps 158 at the receiver, FIG. 8.

Referring again to FIGS. 9A–9B, it will be noted that each of the reeds, A, B, C, . . . N of relay 172, is provided wtih a contact as a A' and these contacts are connected by appropriate circuitry to the indicator wiring shown over the brackets AI, BI, CI, NI, all of which have identical wiring, hence only one needs to be explained. Thus, referring to the vibratory reed A, and its contact A', the circuit extends at 175 through resistor 176, junction 182, and condensor 177 to junction 178 on the negative supply line 179 which is connected to a six volt battery 180, the positive supply of which is connected through the "on-off" switch 161, see FIG. 8, to the positive supply line 180, of the read out circuitry which is also connected to the supporting bar 181 of the vibratory reeds A, B, C, . . . N. Therefore, when reed A vibrates due to a properly modulated radio signal being received at antenna 165 the operator will hear such modulated tone at the audio output 160 and at the same time the reed A will be set into vibration causing momentary and repeated contact with the contact A', and assuming switch 161 of the receiver (FIG. 8) is closed a circuit is completed through the reed-relay 172, contacts A-A' and resistor 176, junction 182, junction 183, resistor 184, transistor 190 to junction 192 on bus 179. A circuit also extends from junction 185 through resistor 186 to bus 179. The conduction of transistor 190 permits current flow from bus 180 through resistor 187, junction 196, coil relay 188, signal lamp 189, transistor 190 to junction 192 on bus 179. The lamp 189 and relay 188 are accordingly energized, such energization being continued so long as a signal is received by the radio receiver 164 and the reed-relay contacts A-A' remain closed.

Assuming that the switch 162 is moved to the "Lock" position, bus 169 will accordingly be energized at positive potential. During conduction through the signal lamp 189, by way of the circuit mentioned, junction 196 is lowered to a certain potential by the voltage drop through resistor 187, and meanwhile junction 183 has also been brought to a prescribed potential, and this causes transistor 194 to become conductive, from junction 195 on bus 169, thence through transistor 194 to junction 183 and through resistor 184, junction 185 and resistor 186 to bus 179. Once initiated the conductive circuit through transistor 194 will continue, so long as bus 169 remains energized, and so long as such circuit continues, a circuit will also be maintained from junction 195 through transistor 194 to junction 196 on the signaling circuit, and thence through the coil of relay 188, signal lamp 189, transistor 190 to junction 192 on bus 179. Therefore, even though the contacts A-A' of the reed-relay may cease to be closed, after cessation of the received signal, the two transistors 194 (of which 194 acts as a self-holding contact of a relay) and transistor 190, will continue conductive, and the signal light 189 will remain illuminated and relay 188 energized, for closing its work contacts, for controlling any sort of external load desired. However, should the switch 162 be in the "Mom" condition, the self-holding circuit through transistor 194 will not be established, and at the end of the received signal, contacts A-A' will cease vibration, and in such event the illumination signal at lamp 189 and energization of relay 188 will cease.

The signal display units BI, CI, . . . NI, are identical with AI, and when any of the reeds B, C, . . . N, is set into vibration, the corresponding signal lights and output relay will be energized either under the "Mom" (momentary) mode of display or "Lock" (continuous) mode of display.

The circuits of FIGS. 9A-9B so far described are suitable for the hand-held portable military or civilian type equipment shown in FIG. 8. Where, in a military or civilian operation, some of the seismic sensors are adapted to be placed in relatively permanent locations, then permanent wiring connections may be made from the sensor, back to the receiving station and the radio mode of transmission dispensed with. Thus at a military air field of some permanency, or at a civilian air field, civilian manufacturing establishment, or at an individual's residence or place of business, there may be situations where permanently installed sensors can be used. It is entirely possible that in a particular installation some seismic detectors connected by radio links and some permanently wired seismic sensors will be used. Wherever there are radio linked seismic detectors, the radio receiving equipment shown under the brackets 166 and 167 and opposite the bracket 164, and utilizing the reed-relays 172 (or equivalent identification selection) may be utilized for the radio equipment. But the permanently wired sensors are handled slightly differently. Thus referring now to FIGS. 10 and 11, which might for example be at a civilian plant or individual's residence, or around for example a civilian airport, there may be provided one or many seismic sensors 26, as shown in FIG. 10. In this instance the spike 25 is unscrewed and the sensor, if not already housed in a water tight casing, is provided with one. Typically the sensor in its water tight casing will be placed about six inches below the level L of the surface where it is planted, which might for example, be at selected locations around a residence, as in the plantings and shrubbery around a house, or they might be planted at or adjacent the entrance driveway of a residence. Then from each sensor there is run any convenient permanent wiring as at 196, such wiring being a properly protected pair of wires leading, see FIG. 3, from terminals 21 and 22 of the sensor. In short, the direct output of the sensor may be carried for considerable distances over wires of suitable gauge, which can be weather protected as at 196. These wires may be placed underground where desired, or run through buildings or overhead, as convenient. The incoming pairs of wires from the variously disposed sensors around the property to be guarded, are run to some central location, which might be a military police headquarters of a military installation of permanent character, or to the headquarters of the security police in a large manufacturing establishment, or in any convenient part of a residence, where the equipment can be conveniently observed. This is not to say that radio link detectors may not also be used along with wired sensors in some installations, since in a very large property such as a vast military installation, or a very large industrial plant, it may be difficult and expensive to provide permanent wiring for remotely situated sensors, and as to these therefore the radio links can more economically be used. As to only those wired sensors, which are illustrated at O, P, Q, . . . Z, etc. in FIG. 11 and under brackets O and P . . . Z, etc. of FIG. 9B, the incoming leads 196-O, 196-P, 196-Q . . . 196-Z are run to the central location 200 where the incoming pair from each sensor serves as the input for an amplifier, and thence the amplified output goes to a read out display as at 201, for sensor O, 202 for sensor P, 203 for sensor Q, and 204 for sensor Z. Each of these read out units contains a display light as at 201L-201Z and an output terminal 203O-203Z from the relay of the device. These output terminals are connected by appropriate wiring to any desired relay system 205 for operating a loud hailer 206, a remote alarm 207, or in case of residential or industrial property the relay system may be utilized for turning on yard lights, or other illumination at 208.

All of the read out devices 201-204 for the wired seismic sensors are identical, and only one of these is therefore illustrated in detail in FIG. 9B. Thus, for the seismic sensor O, it is connected by suitable wired connections 196-O and thence through the wiring as illustrated at 207, similar to FIG. 7, is connected through the amplifier 208 to the signal circuit under bracket O, FIG. 9B. The amplifier can be the same kind of amplifier as at 42 in FIG. 3, or 104 in FIG. 7, or any equivalent amplifier. The signal at 210 is imposed through a diode 211 at junction 212 and thence through junction 213 and resistor 214 and junction 215 and through resistor 216 back to ground but 179. This causes the operation of the transistor 217 which causes the illumination of the light 218 and the energization of relay 219 through a circuit from junction 221 on the positive bus, resistor 220, coil of relay 219, lamp 218, transistor 217 to bus 179 and the signal will be momentary, unless bus 169 is energized via switch 162 as previously described in which case the transistor 224 will be energized as previously described, and the signal will be continued to provide a continued illumination of the signal lamp 218 and energization of relay 219. The energization of the relay 219 completes a circuit from bus 180 through the relay contacts and thence to the output line 201R, which as previously described goes through the relay network to control other work circuits, as desired, see FIG. 11. The circuitry for the outputs at 202, 203 and 204, from sensors P, Q, . . . Z, see FIG. 11, are the same as for the sensor O in FIG. 9, and therefore will not be described in further detail. Accordingly, wherever there are permanently installed sensors, connected by permanent wiring either buried or placed as convenient, the wiring can be as described with reference to the outputs at O and P–Z for FIGS. 9B and 11.

In FIG. 9A, over the bracket 230 there is a test circuit for providing a modulated signal test-input to the audio input of the receiver, shown under bracket 167. This consists of a potentiometer 231 which is operated by a suitable adjustment such as a little wheel 232 adapted to be moved by the operator's thumb. This is connected to the resistor 234 and condensor 235 as shown, between the negative bus 179 and the but 236, which is adapted to be energized by closure of the push-to-test switch 237. From junction 238, a circuit extends through the transistor 239, which conducts from the positive but 236 and thence through its output circuit and resistor 240 to the negative bus, thereby providing at the junction 241 an output signal which is communicated through the condensor 243 and line 242 to the input junction of transistor 244 which is the first audio stage of the audio section 167 of receiver 164. By pushing the switch 137 to closed position, and then turning the wheel 232, the potentiometer 231 is brought through a full range of conditions, and this is exactly the same as the adjustment of potentiometer 107 by means of screw 108, see FIG. 6. In short, in FIG. 9B, the rotation of the adjustment 232 will provide at the input junction 170 a range of modulation frequencies extending over the full range provided by the potentiometers 107 of the modulation oscillation 106. Therefore, the user, in order to test the operation of the reed-relay shown opposite the bracket 172, and to test the integrity and operability of the read out circuits shown over the bracket AI–NI, need only push the button 237 to energize the test circuit, and then rotate the wheel 232 and one-by-one the reeds A, B. C, . . . N, will be brought into vibration and assuming everything is working correctly, the signal lamps of the units AI–NI will be illuminated one-by-one in sequence for testing purposes.

In FIGS. 12, 13 and 14 there is illustrated a further embodiment of the invention whereby a type of signaling equipment may be utilized in connection with the seismic detector equipment of FIGS. 5–7, for extending the benefits of both kinds of equipment. In FIGS. 12 and 13 there is illustrated a radio link type seismic detector 101 which can be precisely as described with reference to FIGS. 5, 6 and 7. To the outside of this seismic detector there is attached by means of a rubber binder 249, an alarm 250 which is shown in greater detail in FIG. 14.

The alarm device at 250 consists of an extended pair of very fine wires normally insulated from each other, which are as fine as hair, but are indeed a separate insulated pair. This pair of wires extends from the device 250, which is actually the receiving station of this particular type of alarm, along any particular path desired, such as around the perimeter of an area which is desired to be guarded, as shown in FIG. 12. It may be assumed, for example, that around this perimeter, and especially in the direction of the solid and dotted arrows, there might be expected enemy infiltration who, in moving toward the area being protected, would step on or break or otherwise mutilate, and consequently cause to be joined together (shorted) at the break, the two wires of the pair 251. In a military operation a long length, literally several thousand feet of such "pair" of wires 251 may be supplied on a spool of moderate size within unit 250 and as much as is needed is pulled out by the person using it and laid or strung along the line to be protected, with the end extending back into and connected at the input to instrument at 250. Instrument or "receiver" 250 includes a relay at 252 to which lines 251 are connected which is energized by lines 254 from battery 255. In known equipment of this type, which is the predecessor of the improvements here described, the battery 255 is of sufficient strength, so that when the pair of wires 251 are joined by intrusive enemy action, the relay 252 will be operated and an alarm given by buzzer 256.

However, according to the present invention a modification is made in that battery 255 is made only of small capacity being insufficient to operate the buzzer 256 and only sufficient to maintain the charge on a condensor 257 which is connected across the terminals of the battery 255. The condensor 257 is of large capacity and the battery 255 is of sufficient strength so that, assuming switch 258 to be closed and relay 252 is not operated, the battery 255 has enough capacity to maintain the charge on the condensor 257, but will not have enough capacity to recharge the condensor once the charge thereon has been dissipated through signal operation. According to this invention there is provided an input plug at 259, which is connected across the battery, and by connecting in a larger capacity external battery at the plug 259, and closing the switch 258, a charge can be placed on the condensor 257, after which the external supply of plug 259 can be disconnected. The device is then "charged" ready for at least one buzzer signal and will stay charged for a long period because of its connection to battery 258. The wire 251 is then placed along the line to be protected and the whole unit 258 is strapped or otherwise fastened against the seismic detector 101, and the seismic detector antenna is extended, so as to energize it. The system is then provided whereby the seismic detector 101 will be physically agitated sufficiently by vibration of buzzer 256, in the event of the latter's actuation, so that the seismic detector 101 is caused to send out its signal, thereby indicating an intrusion across the line of wire 251. Anyone moving across the wire pair 251, sufficiently to break or mutilate them and cause their short circuiting, will energize relay 252 which then, because of the stored energy on condensor 257, will cause the buzzer 256 to be energized. However, when condensor 257 is discharged, the buzzer 256 will then cease operation and this, in effect, permits the seismic detector 101 to again assume its normal detecting function within its own range, undisturbed by mechanical vibrations imposed by buzzer 256, which would otherwise override any signal of 101, caused by seismic earth movements in the vicinity thereof.

In FIGS. 21 and 22 there are illustrated the manner in which the sesimic detectors either of the radio type or of the light signal type, can be hand-emplaced by military personnel. FIG. 21 illustrates a soldier carrying a pack 260 in which there are spaces for ten separate seismic detector units of the radio transmission type. The pack could as well carry the light signal type, if desired. In utilizing the system the ten seismic detectors of the radio modulation identification type previously described, the user would first take them out one-by-one and by the insertion of a screw driver as shown in FIG. 6, the identification oscillator 106 is adjusted so that each seismic detector sends a radio signal, which is then received on a radio receiver of the type shown in FIGS. 8, 9A and 9B. The adjustment is made so that the signal from each seismic detector matches and is received by one of the reeds, A, B, C, . . . N, of the radio receiver, FIGS. 8, 9A and 9B. This is very easy to do. The radio receiver is simply turned to the "On" condition and the switch 162 is moved to the "Lock" mode of operation. Then one-by-one the seismic detector units 101 are removed from the pack 260 adjusted, so as to bring into operation one of the signal lights 158, one for each seismic detector. This tests the integrity of the adjustment and operability of the radio signal links back through the receiving station. The military user S, then takes the pack 260 on his rounds and places the seismic detectors where appropriate, in each instance placing it by jabbing the spike 25 into the ground at the location so as to set the sensor 101 in a vertical or near vertical position, then pulls out the antenna 116 which automatically energizes the radio transmitting system. The soldier then moves onto the next place and as he does so a cooperating soldier holding the receiver, FIGS. 8 and 9A–9B, back at a central place can note the operation of the seismic detector due to the footsteps of the soldier S who placed it while in the vicinity thereof, and this tests out the system one-by-one as the units are placed. The operability of the units can thereafter be tested again, as often as desired, merely by walking the rounds, from one seismic detector to the next. A cooperating soldier at the receiver will receive (or if inoperative, not receive) the signals from each unit 101 as the human-seismic waves are produced by the soldier making the rounds.

FIGS. 16 and 17, which are related, and FIGS. 18 and 19, also related, illustrate a mode of deployment of the seismic sensors by the use of a small airplane or helicopter.

In FIG. 20 a small airplane A is provided with a canister C for containing a plurality of the seismic sensors which are dropped one at a time as the plane flies. This canister is provided with the necessary mechanical contrivances for releasing the seismic sensors 101 one at a time from the canister and releasing their individual caps. Alternatively ten sensors may be carried easily in a light airplane and may be dropped one at a time by a passenger while a pilot flies the plane over the positions where the drops are to be made. In short, the canister method of dropping is desirable but not essential.

In FIG. 20 one such seismic sensor 101-1 has just left the canister C. Another is illustrated at 101-2 with the sensor 101, with its antenna pulled out, suspended from a line attached to a parachute P. In this condition the unit falls as shown in the position 101-3 to the position 101-4 where the parachute is snagged in the high branches of trees and the sensor 101 then breaks loose from the parachute and is falling down. It falls to earth but is connected by antenna wire B to the antenna which is still attached to the parachute, and as illustrated at 101-5, sensor 101 spikes itself into the earth where it remains and is connected by suitable wire B to the antenna 116 which remains attached immediately below the parachute. The manner in which this is accomplished is shown in greater detail in FIGS. 15–17.

For the aerial deployment for the radio-transmitter type of seismic detector, the housing of the package 101 is extended at its upper end 260, and is fitted with a cap cover 261 having an internally spun edge 262 to match the open end of the canister and seats upon a small flange 264 on the inner wall of the canister extension 260. The cap is held in place by two spring clips 265—265 which are adapted to be pushed inwardly by the finger buttons 266. This can be done by the operator or automatically when dropped from canister C. Two springs 267 are provided to quickly eject cap 261 once it is released. These springs are compressed and bear upwardly at 268 against the inside of the cap and downwardly through small plates 269—269 attached to the lower ends of the springs, against the upper surface of a coil 270 of antenna connecting wire, posts 267A inside each spring are attached to the cap 261 to assist in keeping springs 267 straight. When the catches 265 are depressed inwardly, the cap will be released and the springs 267 will propel the entire cap 268 away from the canister 101, as shown in FIG. 17, where the cap 261 is free of the remaining equipment. In FIG. 15 the seismic detector 101 is shown with the cap 261 in place, and it is in this condition that the operator is an airplane, would pick it up while pressing the two buttons 266 inwardly pop the lid off as the entire sensor 101 is dropped out of an open airplane window. When this occurs a parachute 271 flies out and opens, and being connected by the parachute shroud line 272 to an eye 274 at the outer end of the antenna 116, will pull the antenna 116 out to full extension. The outer tube portion 116A of the telescopic antenna is drawn outwardly from its supporting tube 275, within the seismic detector structure. It will be noted that this outer tube 116A of the antenna contains a small detent aperture 276 at its lower end, and as it pulls upwardly to its extended condition, the nose 277 on a spring catch 278 will enter the aperture 276 and in this position restrain the antenna 116 in its extended condition. In this condition the antenna is extended but is ot completely withdrawn from the body of the seismic detector unit 101. A collar 279 is attached to the outer (and hence lower) portion 116A of the extensible antenna, and is electrically connected by coiled up antenna wire 280 to the crystal control transmitter 110 of the system, as shown in FIGS. 6 and 7. The line 280 corresponds electrically to the flexible line 118 of FIG. 7, except that it is much longer and is coiled as at 270 in FIG. 16. Hence with the parachute out and in the air, and with the antenna 116 extended but not completely withdrawn from the shell 102 of the seismic detector 101 the unit falls as shown in the position 101-2 and 101-3 of FIG. 20. However, when the parachute is snagged on the high branches of jungle growth for example, the additional pulling force will cause the antenna 116 to be pulled out from engagement of the hole 276 with the nose 277 of the spring catch 278, and then the seismic detector unit 101 will fall free as shown at position 101-4 of FIG. 20, the antenna remains attached to the parachute and antenna lead wire 280 spins out of coil 270, as needed by the fall of the seismic detector 101, until it reaches the earth and finishes at a position as shown at position 101-5 in FIG. 20. In this condition the aerial is held in an elevated condition suspended by the snagged parachute, but is connected to the seismic detector 101 which has fallen and spiked itself into the earth. The aerial lead wire is a very small coaxial cable and is hardly detectable in jungle or forest growth.

For deployment of the light signal type of seismic detector unit, there is utilized the configuration shown in FIGS. 18 and 19 where the upper portion 290 of the housing 102 of the seismic detector is extended to contain the height of the light molding 36. In this instance the light molding is attached to a circular base 291 seated upon flanges 292, and is held in place by break-away rivets 294, which can be of plastic or similar material capable of allowing the light unit 291-36 too separate from the flange 294 when given a slight jerk, as when the parachute P snags on a tree of jungle growth as shown in FIG. 19. Beneath the flange 291 there is also mounted the lamp voltage supply 29, and in this instance it is connected by the cable 295, which as shown in FIG. 3, contains three wires cabled at 295, by which the gate switch section 28 is connected to the lamp voltage supply section 29 in FIG. 3. The cable 295 is coiled at 296, see FIG. 18, and rests on an internal flange 297. The cap 290 is provided with springs 298, similar to those at 267, in FIG. 16, except that they are longer, and inside the springs may be provided posts 298A, attached to the cap to keep the springs straight, the same as in FIG. 16. The springs are compressed and bottom against the flange 291 of the light unit. When the detent springs 265 are depressed inwardly by pushing on the finger buttons 266, the entire cap is popped off the end of the seismic detector canister 102, and the parachute P then pops out into the wind where it inflates. The parachute is connected by its shroud lines 272, to an eye 299 in the end of the light molding 36, and decelerates the rate of fall of the entire unit 101, to a safe falling speed. At this time the light package, composed of the light molding 36, light 35, flange 290 and the voltage supply 29, are still in place on the flange 292, being attached by the break-away rivets 294, and the unit then falls until in the event the parachute P snags on the high branches of forest or jungle growth, it will in such event pull the light unit 36-291 sharply outward, breaking the rivets 294, and in such event the remaining portions of the seismic sensor 101 will fall downwardly to the position shown in FIG. 19, spinning out as much as needed of the cable 295 during the fall, by which the light unit 36–291 is connected. The light unit 36–291 is held suspended in the high branches of the tree. In the event the parachute P does not snag, the lighting unit remains in place, the fall of the entire package being maintained at a safe falling speed by the action of the parachute and the unit then sends out the light from ground level.

It will be understood that the particular details of radio transmission links, the particular type of identification employed for distinguishing one seismic detector from another (which in this instance is an amplitude modulation type where the modulation is at audible or near audible frequencies) and the forms of amplifiers, and types of batteries used, may be varied within the skill of known radio technology without departing from the spirit and the scope of the invention.

As many widely apparently different embodiments of this invention may be made without departing from the spirit and scope thereof, it is to be understood that we do not limit ourselves to the specific embodiments disclosed herein.

hat is claimed is:

1. A surveillance system comprising a plurality of sensor devices deployed in spaced relation on the earth, each of said devices comprising a sensor for generating an electrical signal in response to a seismic disturbance of the order of magnitude of that caused by footsteps of a human being in the vicinity of the sensor, a radio transmitter, an amplifier having its input connected to the sensor so as to be controlled thereby and its output connected to the radio transmitter for activating said transmitter when said electrical signal is generated to cause said transmitter to transmit a signal in response to seismic disturbance of the sensor, the radio transmitters of the devices each having a coding device connected thereto for distinctively coding the transmitted signal of each device for identification of said signal upon reception at a remote location, and a remote receiver station having a radio receiver capable of receiving the radio signals transmitted by all of the devices, discriminator means connected to said receiver for selectively responding to the code signal of each device received by said receiver, and a plurality of responsive devices of a number corresponding to the number of said sensor devices and each connected through said discriminator means to said receiver for responding selectively to the coded signals received by said receiver.

2. The system of claim 1 in that the receiver, discriminator means and responsive devices are "compactly" arranged in a single case of a size capable of being held and carried in the human hand.

3. The system of claim 2 including an extensible antenna mounted on said case and a self-contained power source in said case for said receiver, discriminator means and responsive devices.

4. The system of claim 1 in which said responsive devices are lights.

5. The system of claim 1 including a self-holding circuit for each responsive device which, when energized, maintains the responsive device activated after an initial energization, and manually operable switch means having a first position for energizing said self-holding circuit and a second position for causing activation of said responsive devices for only as long as a radio signal is received from the particular transmitter to which it is responsive.

6. The system of claim 5 including means for selectively activating and de-activating the self-holding circuits of all of the responsive devices.

7. The system of claim 1 including self-contained test means for generating signals at said receiver corresponding to the coded signals of the individual devices for self-testing of the responsive devices at said receiver station.

8. A surveillance device comprising the assembly of a sensor capable of generating an electrical signal in response to seismic waves of the order of magnitude of seismic waves caused by footsteps or the like body movements of a human being in the vicinity of the sensor, a signaling device, an amplifier having its input connected to the sensor and its output connected to the signaling device for operating the signaling device in response to seismic disturbances of the sensor of said magnitude, a housing, said sensor, signaling device and amplifier being contained in said housing, alarm means physically attached to said housing for vibrating said housing sufficiently to actuate said sensor, circuit means extending from said alarm means capable of being actuated by intrusion thereagainst, said alarm means including a self-contained power source capable of energizing said alarm means to cause vibration thereof for only a short period.

References Cited

UNITED STATES PATENTS

| | | | |
|---|---|---|---|
| 2,448,713 | 9/1948 | Hansell | 325—116 X |
| 2,551,609 | 5/1951 | Kohr et al. | 325—112 |
| 2,600,967 | 6/1952 | Chernowsky | 340—17 |
| 2,683,867 | 7/1954 | Vann | 340—17 |
| 2,717,309 | 9/1955 | Campbell | 325—111 X |
| 2,831,967 | 4/1958 | Bayze | 325—112 |
| 3,082,414 | 3/1963 | Papaminas | 340—224 X |
| 3,147,467 | 9/1964 | Laakmann | 340—16 |
| 3,258,762 | 6/1966 | Donner | 340—16 X |
| 3,360,772 | 12/1967 | Massa | 340—17 |

ROBERT L. GRIFFIN, Primary Examiner

B. V. SAFOUREK, Assistant Examiner

U.S. Cl. X.R.

325—112; 340—16, 17, 258, 261